(12) United States Patent
Beck

(10) Patent No.: US 6,460,931 B2
(45) Date of Patent: Oct. 8, 2002

(54) MECHANICAL NECK REST RETRACTION DEVICE WITH A MEMORY FUNCTION

(75) Inventor: Christian Beck, Röttingen (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 09/756,720

(22) Filed: Jan. 10, 2001

(65) Prior Publication Data

US 2001/0013718 A1 Aug. 16, 2001

(30) Foreign Application Priority Data

Feb. 10, 2000 (DE) .......................................... 100 05 817

(51) Int. Cl.[7] ............................................... A47C 1/10
(52) U.S. Cl. ...................................................... 297/410
(58) Field of Search ................................. 297/391, 410, 297/61, 411.36

(56) References Cited

U.S. PATENT DOCUMENTS

| | | | | |
|---|---|---|---|---|
| 1,977,159 A | * | 10/1934 | Tursi | 297/410 |
| 2,158,183 A | * | 5/1939 | Hascham | 297/410 |
| 5,232,265 A | * | 8/1993 | Estkowski et al. | 297/410 X |
| 5,655,791 A | * | 8/1997 | Nowack et al. | 297/410 X |
| 6,192,565 B1 | * | 2/2001 | Tame | 297/410 X |
| 6,290,299 B1 | * | 9/2001 | Frisch et al. | 297/410 |

* cited by examiner

Primary Examiner—Peter M. Cuomo
Assistant Examiner—Stephen Vu
(74) Attorney, Agent, or Firm—Lowe Hauptman Gilman & Berner, LLP

(57) ABSTRACT

A neck rest retraction device comprises a neck rest rod having stop notches engageable with a locking member, and an elongated actuator having a plurality of detent recesses formed thereon to be engaged with a detent member carried by an lower end of the neck rest rod. The gauge of the detent recesses corresponds to that of the stop notches. An original position of the neck rest rod, defined by engagement of the locking member with one of the stop notches, is thus memorized by engagement of the detent member with the corresponding detent recess when the actuator is forced to move downwardly. The original position of the neck rest rod is automatically restored in accordance with disengagement of the detent member from the corresponding detent recess when the actuator is released to move upwardly.

29 Claims, 3 Drawing Sheets

MECHANICAL NECK REST RETRACTION DEVICE WITH A MEMORY FUNCTION

FIELD OF THE INVENTION

The invention relates to a mechanical neck rest retraction device with a memory function.

In two-door vehicles, the rear-seats become accessible only by tilting forwards the backrest of the driver's or front-passenger's seat or the whole seat. If the neck rest is in a relatively elevated position a clash may occur between the neck rest and the roof or the sun visor of the vehicle. The same problematics appears in vehicles with a load pass-through function in which the rear backrest can be tilted forwards. Here, the neck rests may clash with the roof.

BACKGROUND ART

It is known as such to convert the tilting motion of the backrest or the whole seat into a retracting motion of the neck rest, which purpose normally is served by a pulling rope or Bowden cable, particularly a Bowden cable, which transforms the displacing force of the backrest into a pulling force on the neck rest rods. It further is known to automatically move out the neck rest again once the backrest is tilted back and the Bowden cable is relieved of its load. This is accomplished by means of a spring which engages the neck rest rods. Finally, it is also known to employ a so-called memory function here, i.e. to effect a positioning of the neck rest back to the same position from which it was retracted. Since the interacting components of such a retraction device naturally have a certain tolerance it is difficult in the known neck rest retraction devices to carry out the return travel to the original position in such a way that a locking action with the respective notch of the neck rest rod really is brought about.

SUMMARY OF THE INVENTION

It is the object of the invention to provide a mechanical neck rest retraction device in which the neck rest, after being retracted, surely is moved back to the original position of detent. Moreover, the neck rest is to be capable of manually being pulled upwards or being pushed in by actuating a control button like in conventional systems.

The object is attained by the following features of the present invention.

As is known as such, the invention provides a movably supported locking member which is designed to yieldingly be brought into engagement with one of several stop notches of a neck rest rod. In neck rest assemblies using no automatic retraction, the locking element mostly is disposed in the upper portion of the neck rest sleeve. In neck rest assemblies using an automatic retraction, the locking element normally is disposed within the seat or at the lower end of the neck rest sleeve because the interlocking needs to be separated from the automatic retraction device. In this case, the interlocking which is father below has to be actuated from the head of the neck rest sleeve via an appropriate reversal if the neck rest is intended to be pushed in by hand.

The invention further provides a bridge member which is connected to the lower end of the two neck rest rods. This also is included as such in the state of the art. The bridge member has movably supported therein a detent member which is biased by means of a first spring. According to the invention, an elongate actuator is provided which is adapted to be moved in parallel with the axis of the neck rest rods and which is engaged by a pulling rope, e.g. the actuating rope connected to the seat backrest in the shape of a Bowden cable or the like. The pulling rope, when actuated, will pull the actuator downwards against a second spring which biases the actuator upwards. The actuator is supported in a mounting disposed in the backrest which, therefore, is "stationary". Hence, if the term "stationary" is referred to below this will mean "fixed in the backrest".

The actuator has a series of detent recesses, which series extends in parallel with the neck rest rods or in parallel with the axis of the actuator. The gauge of the detent recesses is equal to the gauge of the stop notches in the neck rest rod. The previously mentioned detent member is opposed to the detent recesses, but gets into an engagement with one of the detent recesses, however, only under certain conditions which will be described below. Anyhow, the arrangement of the series of stop notches, on one hand, and the detent recesses, on the other, is such that if the neck rest rod is caught by an engagement of the locking element into one of the stop notches the detent member comes to lie between two adjoining detent notches.

The actuator interacts with a stationary guide, i.e. such that if the actuator is in an upper position the detent member is out of engagement with the actuator, but that the actuator is moved towards the detent member from a given displacement path onwards, which causes it to engage the next following detent recess.

Finally, the actuator has mounted thereon an unlocking member, which actuates said locking member for the release of the neck rest rod if the actuator is moved downwards. It is to be understood that the locking of the neck rest rod has to be cancelled if the neck rest is intended to be retracted.

It can be seen from the above description that if a pull is applied to the pulling rope the actuator is displaced, although a motion of the bridge member and a retraction of the neck rest do not take place yet initially. The result of the downward motion of the actuator is that the detent member in the bridge member engages the next following upper detent recess only after a certain displacement path of the actuator. Now, if the actuator is moved farther downwards it will also carry along the bridge member and, hence, the neck rest until this one comes to abut against the upper side of the backrest. If the backrest is tilted back again and, hence, the pulling rope is relieved from load the second spring will be able to displace the actuator and, thus, the neck rest to the top again, i.e. for a time until the guide brings the respective detent recess out of engagement with the detent member. This generates a certain excessive lift which surely guarantees that the locking element takes a position with respect to the originally occupied stop notch so that an efficient locking action takes place. The excessive lift is even enhanced by the fact that the detent recess, according to an aspect of the invention, is wider than the detent member so that in spite of the detent member getting caught in the detent recess it is not grasped by the actuator, during its downward motion, until the upper wall of the detent recess gets into engagement with the side of the detent member which is associated therewith.

According to an aspect of the invention, the actuator consists of two approximately parallel portions the first portion of which has the series of detent recesses and interacts with the guide and the second portion of which is connected to the pulling rope. Between the portions, an extension spring is disposed which transmits the motion of the second portion onto the first portion with the portions interacting via stops such that while the second portion is moving upwards the first portion is carried along. The unlocking member is connected to the second portion.

In this design, if the actuator moves downwards the bridge is thus actuated via the extension spring which is connected to the second portion which, in turn, is engaged by the pulling rope. Here, the function of the extension spring is to prevent any damage from occurring if the retraction mechanics is released with the neck rest pushed in. If the bridge member arrives early at the final stop the extension spring will be elongated and, hence, absorbs the force which is applied.

According to another aspect of the invention, the actuator may have a toothing with which a pivotally supported toothed segment interacts. The pulling rope engages the toothed segment. Thus, a gear ratio may be obtained for the path of the pulling rope. For example, the path of the pulling rope may be smaller than the path of displacement of the neck rest.

Various constructional options can be imagined for guiding the actuator in the backrest, e.g. in a holder plate or the like. According to the invention, one of them provides that the guide consists of a groove or slot that the one guide portion deflected from the detent member in the upper region has, but which, for the rest, is substantially straight and parallel to the longitudinal extension of the actuator. A follower portion is provided on the actuator, which engages the groove or slot. To prevent the actuator from unnecessarily being tilted two such grooves or slots preferably are provided, each with a cam follower of the actuator.

To reduce the length of the unlocking element, according to an aspect of the invention, a provision may be made to mount it on the actuator so as to be uncoupled by the actuator when it has travelled through a given path after the locking member is unlocked.

As a restoring spring for the actuator, it is preferred that a double-scroll spring be provided which displaces the actuator at a uniform force.

BRIEF DESCRIPTION OF THE DRAWINGS

The invention will now be explained in greater detail with reference to an embodiment.

DETAILED DESCRIPTION OF THE INVENTION

Figure 1:
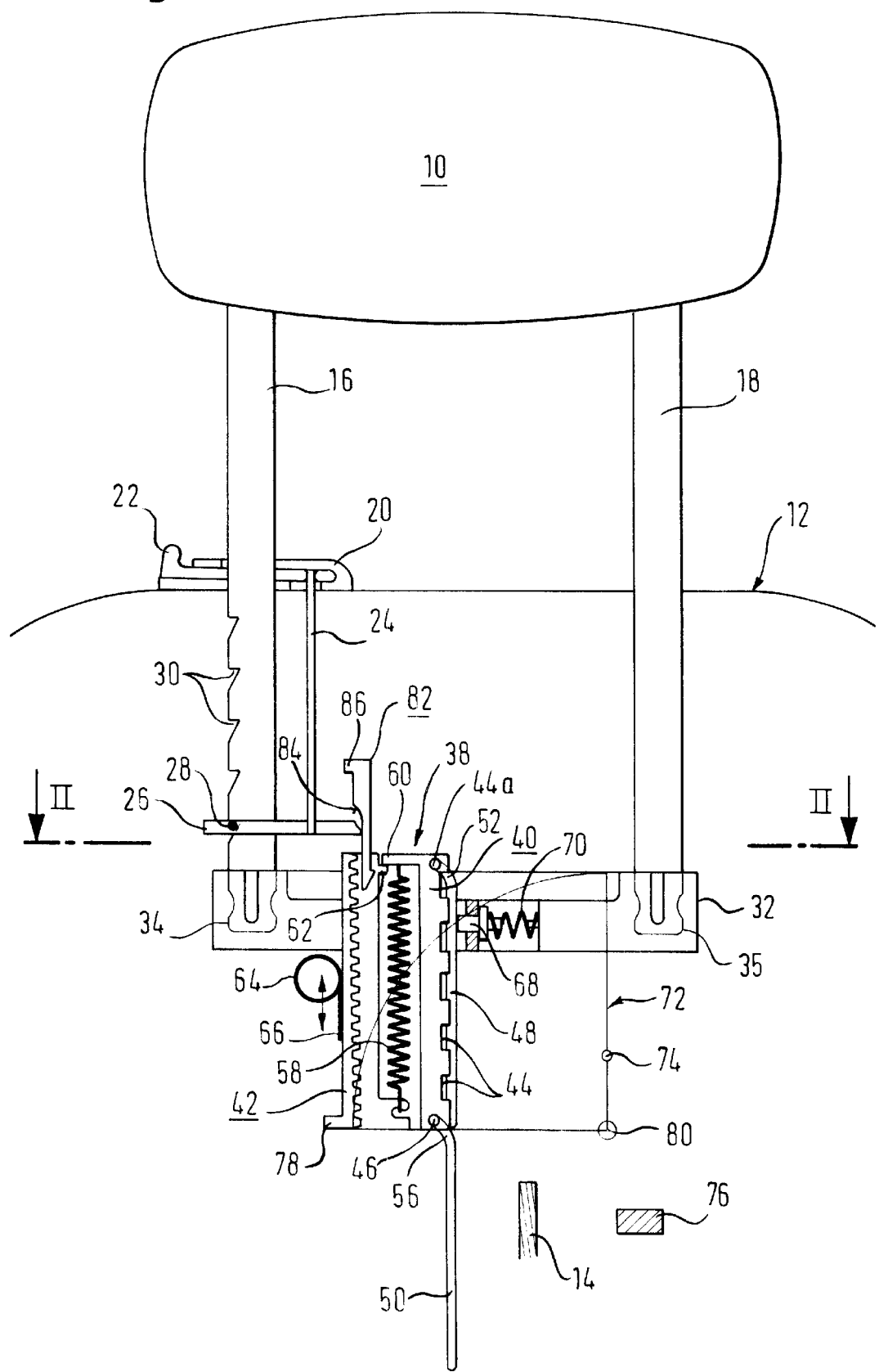
FIG. 1 shows a front view of a neck rest retraction device according to the invention in an extremely schematic way.

Referring to FIG. 1, a neck rest 10 is outlined for a backrest 12, e.g. on a front seat of a two-door automobile. The backrest 12 is adapted to be tilted forwards in order to permit getting to the rear seats. The tilting mechanism has connected thereto a pulling rope which is actuated when the backrest is tilted forwards. The pulling rope is shown at 14. The connection of the pulling rope to the backrest tilting mechanism is not shown. It is known as such.

Figure 2:
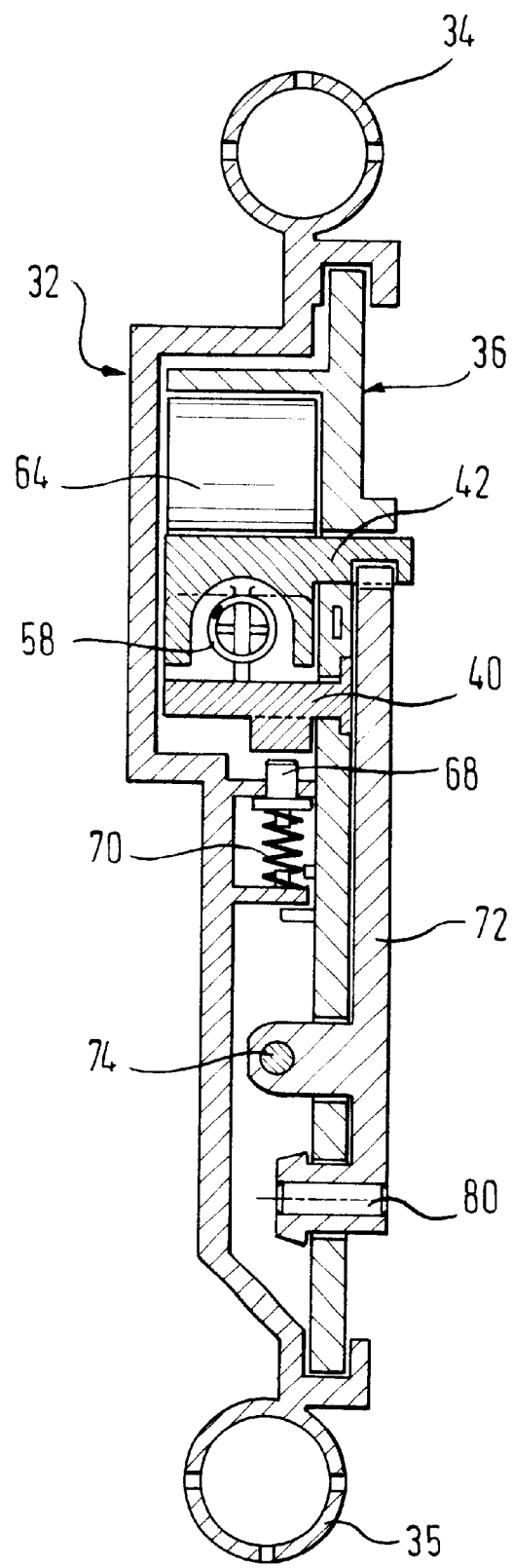
FIG. 2 shows a section through the illustration of FIG. 1 along lines 2—2.

The neck rest 10 has two rods 16, 18 which are received in neck rest sleeves (not shown) in the backrest 12. FIG. 1 merely shows a sleeve head 20 which guides a slide 22 which, in turn, actuates a reversing lever 24 in the backrest 12, which is coupled to a locking element 26 at its lower end. The locking element 26 interacts with stop notches 30 of the neck rest rod 16 via a detent spring 28. Such a mechanism is known as such. The lower ends of the neck rest rod 16, 18 are appropriately connected to a transversely extending bridge member 32. To this end, the bridge member 32 has appropriate mounts 34, 35. As can be seen from FIG. 2 the bridge member 32 is guided by a base plate 36 which is firmly installed in the backrest 12. The base plate 36 also guides an actuator 38 which consists of two portions, i.e. a notched rod 40 and a toothed rack 42. The notched rod 40 has a series of detent recesses 44, which series extends in the longitudinal direction of the notched rod 40 approximately in parallel with the neck rest rods 16, 18 with the gauge of the detent recesses 44 corresponding to the gauge of the stop notches 30 of the neck rest rod 16. The notched rod 40 has included at top and bottom a pin-like follower 44a and 46 each which is guided in a slot 48 and 50, respectively, of the holding plate. The slots 48 and 50 include a bow-shaped portion 52 and 56, respectively, in the upper region. An extension spring 58 engages the toothed rack 42 at bottom and the notched rod 40 at top. The notched rod 40 has an upper lateral shoulder 60 and the toothed rack 42 has an upper lateral shoulder 62. The shoulder 60 is above the shoulder 62 so that if the toothed rack 42 moves to the top the notched rod 40 is moved along to the top.

The toothed rack 42 is engaged by a double-scroll spring 64 at 66 and, thus, biases the toothed rack 42 towards the top.

The bridge member 32 has mounted therein a detent member 68 which is biased by a spring 70 towards the series of detent recesses 44. The toothing of the rack 42 interacts with a toothed segment 72 which is drawn only in its outlines in FIG. 1 and is engaged by the rope of the Bowden cable at 74. Thus, if the toothed segment 72 is pivoted counter-clockwise the toothed rack 42 is moved downwards.

A stop 76 on the mount or holding plate 36 limits the downward path of the bridge member 32. A stop 78 on the toothed rack limits the path of the bridge member 32 if it is pushed down by hand. The position thus obtained corresponds to the minimum position prescribed by the authorities for a neck rest.

Coupled to the toothed rack 42 is an unlocking element 82 which has a slope 84 which interacts with a slope (not designated) of the locking element 26. If the toothed rack 42 is moved down, hence, the locking element 26 is unlocked. An upper lug 86 which is adapted to interact with a firm stop provides for the unlocking element 82 and the toothed rack 42 to be uncoupled so that the unlocking element 82 does no longer follow the path through a certain length during the downward motion of the toothed rack 42. Not until the toothed rack 42 is lifted these two components are coupled again. However, this is of no significance for the function which will be described now.

Figure 3:
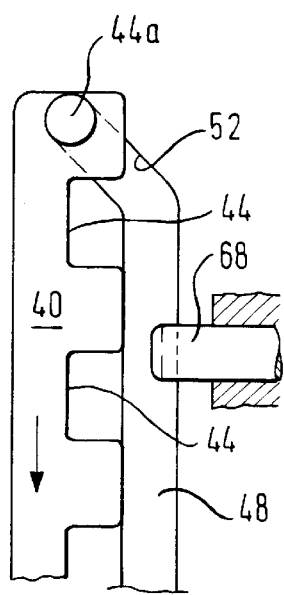
FIGS. 3 through 10 show various actuating positions of the actuator with respect to a detent member.
Figure 4:
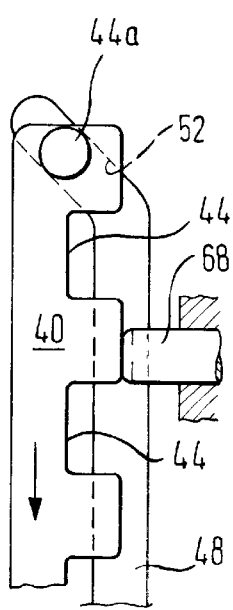
Figure 5:
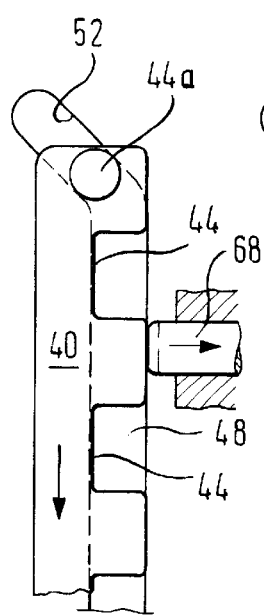
Figure 6:
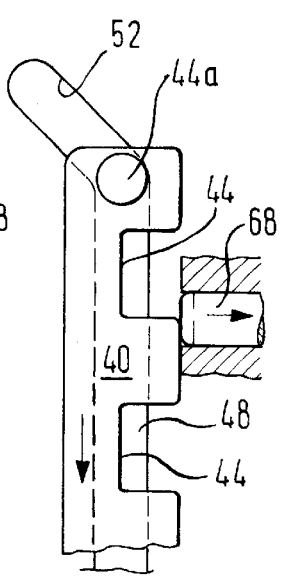
Figure 7:
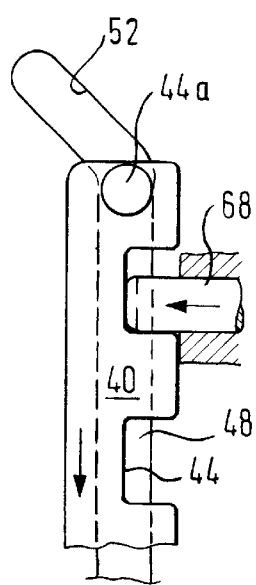
Figure 8:
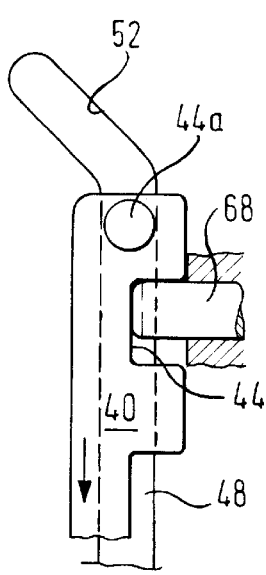
Figure 9:
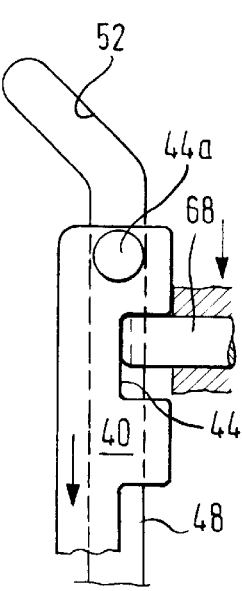
Figure 10:
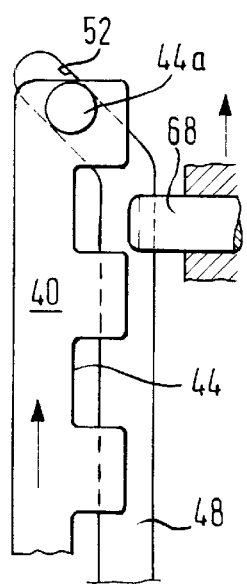

It can be seen from FIG. 1 and FIG. 3, the latter of which depicts the position of the detent member 68 with respect to the notched rod 40, that the detent member 68 is out of engagement with the notched rod 40, although is projects from the recess in the bridge member 32. Now, if the toothed rack 42 is moved downwards against the scroll spring 64 by pulling the pulling rope 14 and pivoting the toothed segment 72 it will carry along the notched rod 40 via the extension spring 58. During the downward motion which is shown in FIGS. 4 through 9 the bridge member 32 and, hence, the neck rest rods 16, 18 will not be carried along initially. Rather, the gradual sideward motion of the notched rod 40, by means of the portion located between the detent recesses, first causes the detent member 68 to be pushed inwardly against the spring 70 (FIGS. 4 through 6) until the follower 44a has reached the straight portion of the slot 48. This enables the detent member 68 to be caught in the respective next upper detent recess. Since the width of the detent recess 44 is larger than the width of the detent member 68 another displacement path is passed through until the bridge member 32 is carried along as can be seen by a simultaneous glance at FIGS. 7 and 8. Thus, it is only from the position of FIG. 8 onwards that the retraction of the neck rest is performed up to the stop of the neck rest 10 at the upper side of the backrest 12. The scroll spring 64 is adequately tensioned here.

Now, if the Bowden cable is relieved from load because the backrest 12 has been tilted back to its initial position the toothed rack 42 may be moved to the top by the scroll spring 64. This motion causes the notched rod 40 to be moved along to the top as well by means of the previously described shoulders 60, 62 until the follower 44a gets into the bow-shaped portion 52 of the slot 68, thus causing the detent member 68 to get out of engagement with the detent recess 44.

In the mode of action described, the return travel is slightly larger than the downward travel of the bridge member 32 so that it is surely guaranteed for the detent spring 28 of the locking element 26 to get into engagement with the stop notch 30 associated therewith. It further ensues from the mode of action described that the return travel is also performed to that level of the neck rest from which the retraction took place. This results from the gauge of the detent recesses 44, which corresponds to the gauge of the stop notches 30.

Finally, it can be seen that the neck rest can conventionally be adjusted by hand both downwards and upwards. For a lift, it merely is required to pull the neck rest 10 upwards at some force, which causes the detent spring 28 to slide from one associated stop notch into the succeeding one. For a downward displacement, the slide 22 needs to be actuated in order that the detent spring 28 be brought out of engagement with the stop notch associated therewith.

What is claimed is:

1. A mechanical neck rest retraction device with a memory function comprising:
    a movably supported locking member (26) which is designed to yieldingly be brought into engagement with one of several stop notches (30) of at least one neck rest rod (16);
    a bridge member (32) which is designed to be connected to the ends of the two neck rest rods (16, 18) and in which a detent member (68) biased by a first spring (70) is movably supported;
    an elongate actuator (38) adapted to be moved in a parallel direction with both axis of the neck rest rods (16, 18) downwardly against a second spring which biases the actuator upwardly
    a series of detent recesses on the elongate actuator (38) for the detent member (68), which extends in a longitudinal direction of the actuator (38) and has a spacing which corresponds to a spacing of the stop notches (30), the detent member (68) being located between two adjoining detent recesses (44) when the locking member (26) is in engagement with one of the stop notches (30); and
    a stationary guide (48) which interacts with the actuator (38) such that when the actuator (38) is in an upper position, the detent member (68) is out of engagement with the actuator (38), such that the actuator (38) is moved towards the detent member (68) from a given displacement path, which causes it to engage the next following upper detent recess (44) and an unlocking member (82) connected to the actuator (38), which actuates said locking member (26) for the release of the neck rest rod (16) when the actuator (38) is moved downwardly.

2. The neck rest retraction device according to claim 1, wherein the actuator (38) has two approximately parallel first and second portions (40, 42), the first portion (40) has the series of detent recesses (44) and interacts with the guide (48), wherein an extension spring (58) is disposed between the portions (40, 42), which transmits the motion of the second portion (42) downwardly, onto the first portion (40) with the portions (40, 42) interacting via stops (60, 62) such that while the second portion (42) is moving upwardly, the first portion (40) is carried along, and wherein the unlocking member (82) is connected to the second portion (42).

3. The neck rest retraction device according to claim 1, further comprising a toothed segment (72) which is pivotally supported and interacts with a toothing of the actuator (38).

4. The neck rest retraction device according to claim 3, wherein a stationary end stop (76) is provided for the bridge member (32).

5. The neck rest retraction device according to claim 1, wherein a stop (78) is provided for the bridge member (32) on the actuator (38).

6. The neck rest retraction device according to claim 1, wherein the width of the detent recesses (44) is larger than the width of the detent member (68).

7. The neck rest retraction device according to claim 1, wherein the guide (48) has a slot that is substantially straight and parallel to the longitudinal extension of the actuator (38), and is deflected from the detent member (68) in an upper region, wherein a follower portion (44a, 46) is provided on the actuator (38) to engage the slot.

8. The neck rest retraction device according to claim 1, wherein the unlocking portion (82) is mounted on the actuator (38) at such a height that it is uncoupled by the actuator (38) when it has travelled through a given displacement after the locking member (26) is unlocked.

9. The neck rest retraction device according to claim 1, wherein the guide has a groove that is substantially straight and parallel to the longitudinal extension of the actuator, and is deflected from the detent member in an upper region, wherein a follower portion is provided on the actuator to engage the groove.

10. A neck rest retraction device for adjustably supporting a neck rest on top of a back rest of a seat, said device comprising:
    at least one neck rest rod for supporting the neck rest at an upper end portion thereof, said neck rest rod adapted to be retractable into and protractible from the back rest, said neck rest rod having a plurality of stop notches formed thereon; wherein, a bridge member is connected to the ends of the two neck rest rods and in which a detent member biased by a first spring is movably supported;
    a locking member adapted to be movably supported by the back rest for engaging one of said stop notches to lock said neck rest rod;
    an elongated actuator moveable along a path in an axial direction of said neck rest rod, said actuator having a plurality of detent recesses formed thereon, a gauge of said detent recesses corresponding to that of said stop notches; and
    a detent member carried by a lower end portion of said neck rest rod, said detent member being sized to be receivable in said detent recesses;
    wherein said path comprises an upper section and a lower section;

when said actuator is in the upper section of said path, said detent member is not engaged with said detent recesses so that said actuator and said neck rest rod do not travel together; and when said actuator is in the lower section of said path, said detent member is received in one of said detent recesses so that said actuator and said neck rest rod travel together.

11. The device of claim 10, wherein said path in the lower section extends substantially in a parallel direction with said neck rest rod, said path in the upper section is inclined with respect to said neck rest rod and deflected away from said detent member.

12. The device of claim 11, wherein said path is defined by an elongated slot and said actuator comprises a follower received in and slidably guided by the slot.

13. The device of claim 11, wherein said path is defined by two parallel elongated slots and said actuator comprises two followers spaced along said axial direction, each of said followers being received in and slidably guided by one of the slots.

14. The device of claim 11, wherein said at least one neck rest rod comprises two parallel neck rest rods connected at the lower end portions thereof by a bridge member, said detent member is mounted on said bridge member.

15. The device of claim 14, further comprising a stationary stop for defining a lowermost position of said bridge member in said downward movement of said actuator.

16. The device of claim 14, further comprising a stop formed on said actuator for defining a lowermost position of said bridge member when the neck rest is pushed down by hand.

17. the device of claim 10, wherein a dimension of the detent recesses as measured in said axial direction is larger than the dimension of said detent member.

18. The device of claim 10, further comprising a unlocking member connected to said actuator for disengaging said locking member from one of said stop notches of said neck rest rod in a downward movement of said actuator along said path.

19. The device of claim 18, wherein said unlocking member is respectively uncoupled from and engaged with said actuator during said downward movement and an upward movement of said actuator along said path.

20. The device of claim 18, wherein said detent member is located between two adjacent said detent recesses when said locking member is in engagement with one of said stop notches, and said detent member moves upwardly with respect to said actuator during said downward movement thereof and is received in said detent recess so that a further downward movement of said actuator along said path will cause said detent member, said neck rest rod and the neck rest to move downwardly.

21. The device of claim 20, wherein said detent member moves upwardly with respect to said actuator during said downward movement thereof and is received in an upper one of said adjacent detent recess.

22. The device of claim 18, further comprising
the first spring biasing said detent member in a direction transverse to said axial direction towards the detent recesses; and
a second spring biasing said actuator upwardly along said path.

23. The device of claim 22, wherein the first spring is a coil spring and the second spring is a double scroll spring.

24. The device of claim 22, wherein each of the stop notches has an upper wall and a lower wall, the lower wall being slanted with respect to said axial direction so that said locking member is automatically disengaged from said stop notch when said neck rest rod is pulled upwardly.

25. The device of claim 18, wherein said actuator comprises separate first and second portions connected by an extension spring so that the first and second portions are drawn towards each other in said axial direction, said detent recesses and said unlocking member being formed in the first and second portions, respectively.

26. The device of claim 25, wherein an upper end of the first portion and a lower end of the second portion are connected to opposite ends of the extension spring.

27. The device of claim 25, wherein the first portion comprises a lower surface abutting against an upper surface of the second portion so that the second portion brings the first portion upwards in an upward movement of said actuator along said path.

28. The device of claim 25, wherein the second portion is a toothed rack and said device further comprises a toothed segment meshing with the toothed rack for driving the second portion, and hence said actuator, downwardly along said path.

29. The device of claim 25, further comprising a spring connected to the second portion for biasing said actuator upwardly along said path.

* * * * *